Aug. 31, 1965 J. BRAMLEY ETAL 3,204,159

RECTIFYING MAJORITY CARRIER DEVICE

Filed Sept. 14, 1960

INVENTORS
Jenny Bramley
Arthur Bramley
BY
ATTORNEYS

United States Patent Office 3,204,159
Patented Aug. 31, 1965

3,204,159

RECTIFYING MAJORITY CARRIER DEVICE

Jenny Bramley and Arthur Bramley, Passaic, N.J. (both of 1514 Strathmore St., Falls Church, Va.)

Filed Sept. 14, 1960, Ser. No. 55,970
7 Claims. (Cl. 317—235)

Figure 1:
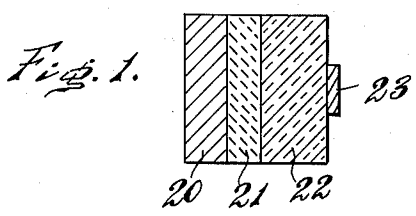

The present invention relates to a rectifying majority carrier device which is suitable particularly as a current controlling device or a high energy particle detector.

A purpose of the invention is to obtain high speed response in a current controlling device and high energy particle detector.

A further purpose is to obtain very low capacitances across such devices.

A further purpose is to facilitate production of devices of this kind.

Further purposes appear in the specification and in the claims.

In the drawings we have chosen to illustrate a few only of the numerous embodiments in which the invention may appear, selecting the forms shown from the standpoints of convenience in illustration, satisfactory operation and clear demonstration of the principles involved.

Each of FIGURES 1 to 5 is a diagrammatic fragmentary transverse section, not drawn to scale, showing one of the rectifying majority carrier devices of the invention. Since the thicknesses in many cases will be measured in Angstrom units, the thicknesses are of course greatly exaggerated. The layers shown are intended to extend parallel to one another.

In the prior art many types of majority carrier diodes are well known. One example is nonlinear resistors, which often take unfamiliar forms. The Mead tunnel diode is of this category (48 Proc. IRE 360 (1960)). Mead in FIGURE 1*a* shows two metals separated by a thin layer of insulator, the insulator being in electrical contact with each of the metals. The thickness suggested for the insulator is about 80 A. With proper contact, the Fermi level in this device will be continuous from each metal through the insulator. In order to maintain the impedance of the device at a low level, the thickness of the insulator must not exceed the above limit of 80 A. Even with this thickness moderately high field intensities are required.

With a field strength of about $2\times10^7$ v./cm., which is required to attain a current density of about $10^6$ amp./cm.$^2$, an insulating layer of 100 A. thickness will require a modulating voltage of about 20 volts, a moderately high value.

In this type of device, an insulator making electrical contact with an n-type semiconductor on each side is satisfactory as an electron majority carrier diode. Semiconductors have the advantage over metallic layers that the conduction band is above the Fermi level in many cases by more than one electron volt. This facilitates the tunnelling process for any given thickness of insulator.

In Jenny Bramley U.S. Patent 2,527,981 of October 1950, a further variation of this structure is proposed. A dielectric 22 makes electrical contact on one side with a metal 21 and on the other side with a semiconductor secondary electron emitter 23. The patent suggests alkali halides as suitable materials for the dielectric and silicon alloys with aluminum as the semiconductor, that is, a degenerate p-type silicon semiconductor. The structure for the degenerate p-type semiconductor allows the conduction band for the semiconductor to be still further raised above the Fermi level for the same energy gap. It was further mentioned in this patent that in order to attain an optimum condition, the insulator should have ionized impurity levels incorporated into its structure.

We have discovered that a rectifying diode can be made by providing an insulator in a structure of this character which does not present the same impedance to currents traversing the circuit in opposite directions for the same value (absolute value, without regard to sign) of the potential difference across the diode. This can be accomplished if the impurity levels in the insulators adjacent the two sides are different, for example because of:

(1) Different donors or acceptors or differences in concentration of donors or acceptors.

(2) Vacancies at the sites of positive or negative ions.

(3) Positive or negative ions incorporated into the crystal lattice with a valence different from the parent ions of the crystal.

(4) Positive or negative charges incorporated into vacancy or interstitial sites of the same type.

This charge distribution forms a built-in potential barrier in the insulator, which varies relatively little with the applied voltage as long as it is below the breakdown electric field gradient for the insulator.

Where the insulator is an alkali halide, for example potassium chloride or sodium chloride, or any one of the other alkali halides, a charge separation in the crystal layer can be obtained if the insulator is heated to about 600° C. with a fairly strong electric field, for example of the order of $10^6$ v./cm. applied across the insulating layer simultaneously. If the crystal is then suddenly cooled to around room temperature, the charges remain frozen in the insulator. This is what is meant by a built-in potential barrier. Thus in sodium chloride, $Na^+$ predominates near one surface, and $Cl^-$ predominates near the other surface.

The steps can be carried out in different order depending upon the material making up the diode. Thus if the diode has a metallic sheet such as tantalum on one side, with a sodium chloride layer extending along in electrical contact with one side of the metallic sheet, and then a degenerate p-type silicon semiconductor extending along in electrical contact with the other side of the sodium chloride layer, the processing may be as follows:

On a clean sheet of tantalum a homogeneous film of sodium chloride is deposited by evaporation, the sodium chloride film in the particular example being about 75 A. thick. Then a homogeneous layer several microns thick of silicon is deposited by evaporation, still in the vacuum. Still preferably in the vacuum, a layer of aluminum is deposited on the face of the silicon layer remote from the tantalum sheet.

To alloy the aluminum into the silicon, this unit is then heated for a short time in an inert atmosphere such as argon or in vacuo to a temperature of 600 to 800° C. Where a built-in potential barrier is desired, a potential difference is applied between the tantalum sheet and the deposited aluminum film at the same time that the aluminum is alloyed into the silicon. The potential difference has a value high enough to separate some of the charges in the sodium chloride insulator so as to form the built-in potential barrier, and the potential difference is maintained until the unit has cooled to about room temperature.

This same procedure described for obtaining a built-in potential barrier can be carried out where the diode comprises a combination of metal, insulator and metal.

Where semiconductors are used in which carriers are injected into the conduction band, the insulator employed in the diode or triode as later explained need not have a potential barrier in order to induce a preferred direction of carrier flow. The height of the conduction band relative to the height of the states occupied by the carriers at the other side of the insulating layer can produce the conditions necessary for a preferred direction of carrier transport, that is, there will be a different probability of tunnelling through the insulator from the states occupied by the majority carriers on either side of the insulator. The term height is used in the same sense as that indicated in FIGURE 20 at page 122 of Ehrenberg "Electric Conduction in Semiconductors and Metals" (Oxford University Press).

The following are examples of structures which possess rectifying properties with built-in potential barriers in the insulators, and therefore are advantageous for current control devices and the like:

(1) Successive layers in electrical contact with one another of metal-insulator-n-type semiconductor.

(2) Successive layers in electrical contact with one another of metal-insulator-degenerate p-type semiconductor.

When we say that there is electrical contact between two layers we mean that the Fermi level through these layers is continuous.

The magnitude of the current transported through the diode will depend upon several parameters of which the following are typical governing the probability of tunnelling through the insulator:

(1) The direction of the electrical field intensity across the diode is important, since the field intensity can either oppose or favor current flow.

(2) The relative heights of the states occupied by free carriers on either side of the insulator is important.

(3) The density of carriers in these states, that is, the conduction band of the n-type semiconductor, is a factor.

(4) A significant role in determining the magnitude of the current is assumed by the distribution of carriers (both majority and minority) on each side of the insulator, which is indicated by the accumulation or depletion of charge tending to modify the field of the built-in potential barrier.

A built-in potential barrier still further governs the relative tunnelling from the various sources of majority carriers. In the case where the majority carriers are electrons, the sources may be the metal, the valence band of the semiconductor, or the conduction band of the semiconductor (if we are not dealing with a dual metal diod). It is possible, however, to have holes which also play an important part in the operation when the majority carriers are flowing in p-type semiconductors.

While the above description of the processing has been directed to diodes composed of a tantalum metal layer, an alkali halide insulator and a silicon-aluminum alloy semiconductor, it will be evident that the principles of the invention can be applied by using other materials.

Where a metal layer is employed for an electrode, the metay may suitably be tantalum, molybdenum or nickel. It will also be evident as later explained that the electrodes may be a semiconductor, although for many cases it will be decidedly preferable to use the metals as electrodes because of their low resistivity. There will often be a metal contact to the semiconductor.

The insulator, instead of alkali halide, can be silicon oxide, either monoxide or dioxide. In the case of the alkali halides it is desirable to eliminate F-center formation by obtaining relatively perfect crystals. The insulator may also be a potassium phosphate glass obtained by melting one of the potassium phosphates, preferably bi-basic potassium phosphate. The insulator may also be a frit composed of a combination of oxides, a typical example being Hommel flux No. 2B–1509, which consists of a composite of silica, zinc oxide, $B_2O_3$, alumina, sodium oxide and BaO. The materials used in the frit are selected because they do not react chemically with the semiconductor or the metallic layer.

The semiconductor may be silicon, germanium, gallium arsenide, gallium antimonide or indium antimonide. These materials are made into semiconductors of the n-type by doping with phosphorus, arsenic or antimony or they are made into semiconductors of the p-type by doping with aluminum or boron, as well known.

A suitable method for making a diode having a metal electrode layer, with a silicon oxide insulating layer and a silicon n-type semiconductor layer is to oxidize a suitably doped silicon layer in an oxidizing atmosphere at a moderately high temperature, say about 900° C., for a short time of the order of a few minutes, and then to deposit the tantalum, molybdenum or nickel layer on the oxidized surface by evaporation. The temperature time cycle should give an insulator of the desired thickness as later explained. The tantalum, molybdenum or nickel used should be as free as possible from impurities so as to reduce the contamination of the insulator and the semiconductor.

Tantalum, molybdenum or nickel are chosen as examples of suitable metals, which do not readily form alloys with the insulator or with the semiconductor during the processing and do not diffuse markedly so as to act as an impurity which could modify the electrical characteristics either of the insulator or the semiconductor. The processing schedule to obtain electrical continuity between the different layers in physical contact so that the Fermi level is continuous is described in U.S. Patent 2,527,981.

We illustrate in FIGURE 1 a metallic layer 20 suitably of tantalum, molybdenum or nickel which forms one electrode and is suitably of sheet form extending over an area of the order of at least a square millimeter. In electric contact with it so as to give a continuous Fermi level is an insulating layer 21 as previously described and in electrical contact with the other side of the insulating layer 21 is a semiconductor layer 22. Thus the metallic layer 20 and the semiconductor layer 22 are effectively parallel. On the remote side of the semiconductor layer 22 and in electrical contact with it is an electrical contact 23, which is preferably of metal which has a low resistivity. Thus the Fermi level is continuous from one side to the other of the composite element of FIGURE 1.

While the structure of FIGURE 1 and the other figures is in many cases likely to be of sheet form, it may be curved or otherwise shaped so as to be spherical, cylindrical or otherwise.

It is important that an ohmic or nearly ohmic contact be made to the semiconductor layer 22 to serve as one of the terminals of the device. The electrical contact should be ohmic so as to allow transport of carriers into the semiconductor, depending upon the direction of the electric field inside the semiconductor. On the other hand, the electrical contact 23 may be fabricated so as to inject the minority carriers into the semiconductor as explained by R. A. Smith, "Semiconductors" (Cambridge University Press) pages 277 to 287.

The invention lends itself very readily to production of a three-terminal device with characteristics suggesting those of a transistor.

Figures 2, 3, 4:
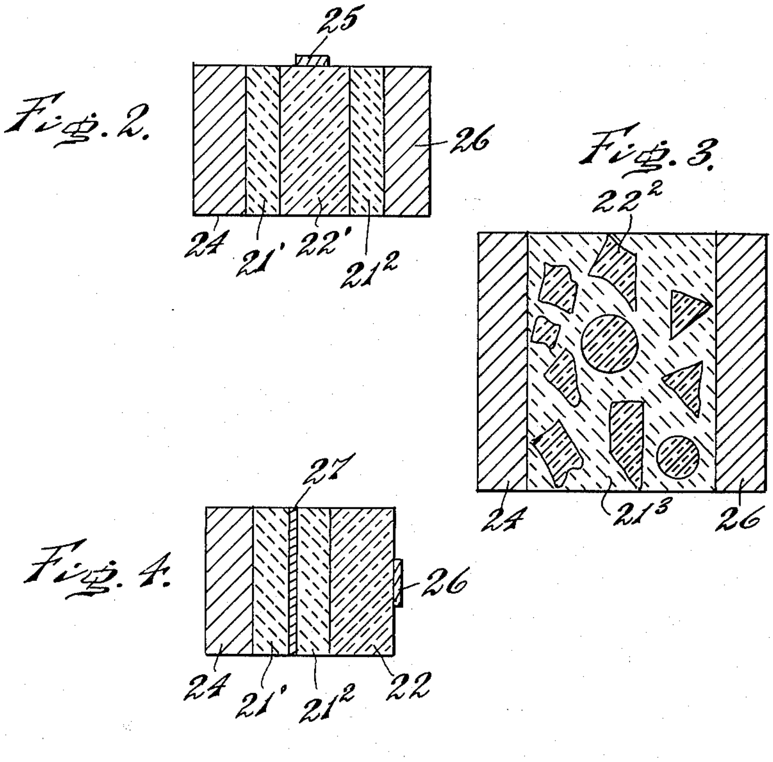

We illustrate in FIGURE 2 an emitter contact 24 suitably of sheet form and suitably of a metal such as tantalum, molybenum or nickel, although permissibly a semiconductor connected to a metallic contact. On one side of the metal layer 24 and in electrical contact with it is an insulator layer 21′ of the character already described, and the insulator layer 21′ on the side remote from the electrical contact 24 is in electrical contact with a semiconductor layer 22′ as previously described. The semiconductor layer 22′ is in electrical contact with a metallic control grid electrode 25, which can be used to modulate the operation of the device as later explained. This control grid electrode 25 is shown positioned at one edge of the semiconductor layer. The other side of the semiconductor layer 22′ from the insulating layer 21′ is in electrical contact with the insulating layer $21^2$ of the character previously described. The side of the insulating layer $21^2$ remote from the semiconductor layer 22′ is in electrical contact with the collector contact 26 which is preferably a low resistivity metal sheet, although it may be a semiconductor which is in contact with a metal contact. Both the terminal at 25 and the terminal at 26 should make a low resistivity contact to the semiconductor.

In certain cases it may be desirable to position the control grid contact 25 at some other location because of the geometry of the device.

In the preferred embodiment of the device of FIGURE 2, the various layers 24, 21′, 22′, $21^2$ and 26 will be parallel to one another and extend over a substantial area suitably of at least one square millimeter.

FIGURE 3 illustrates a construction which somewhat resembles that of FIGURE 2 except that the insulating layers 21′ and $21^2$ have been merged in an insulating layer $21^3$ which extends clear across between the contacts 24 and 26, and the semiconductor layer has been divided into numerous discreet particles $22^2$ of finite size preferably in the range of a micron to a mil which are embedded in the insulating layer. This device is preferably a diode.

In some cases a third electrode for control grid purposes can be advantageously sandwiched in between the portions of the insulating layer as shown in FIGURE 4. In this case the construction is as in FIGURE 1 except that the insulating layer has been separated into two layers 21′ and $21^2$ and an exteremely thin metallic layer 27 is interposed between and in electrical contact with both insulating layers, the layer 27 having a thickness in general not exceeding 100 A. and serving as its own contact for control grid operation. The thinness of the layer 27 allows the carrier to tunnel through the metal film in appreciable current densities.

In the case of FIGURE 2 there is a semiconductor layer interposed between the two insulator layers whereas in FIGURE 4 there is a metallic film interposed between the two insulator layers. The semiconductor layer in FIGURE 2 which will preferably be n-type may have a thickness somewhat greater than the metal layer 27 of FIGURE 4 and still permit fair tunnelling.

Diodes can also be made which consist of a layer of degenerate p-type semiconductor, in electrical contact with a layer of insulator, which is in turn in electrical contact with a layer of degenerate p-type conductor. Where the semiconductor layer in this case is of n-type, different overall characteristics will be obtained.

In many of the above instances, the insulating layer or layers will to advantage have built-in potential barriers. Such films may be accomplished by heating and applying an electrical field or by heating and diffusing donors or acceptors selectively from one side or the other.

The devices of FIGURES 2 and 4 may be considered in effect to be crystal triodes. In some ways they resemble two diodes in series. Transistor terminology is being used.

Thus in FIGURES 2 and 4 the emitter junction consists of emitter contact 24 and insulating layer 21′. The collector junction in this case consists of insulating layer $21^2$ and collector contact 26 in FIGURE 2 or semiconductor layer 22 plus collector contact 26 in FIGURE 4.

Utilizing the concepts already discussed, the insulating layers 21′ and $21^2$ may be crystalline structures as already described with or without space charge regions or built-in potential barriers which approximate the field effects of an electric dipole. The structures in these insulating layers may either be pure insulators, or one of them can be a pure insulator and the other can be an insulator with a built-in potential barrier or both can be insulators with built-in potential barriers. Where both are insulators with built-in potential barriers, one potential barrier can favor current flow in one direction and the other in the other direction or both can favor current flow in the same direction. If the directions of easy flow are similar, it will still be preferable to have different impedance values for the two junctions. This will be determined in part by the built-in potential fields.

The emitter contact 24 can be either a metal or a semiconductor electrically connected to a metal, and if it is a semiconductor electrically connected to a metal it may be of n-type or of p-type and it may be of degenerate type. The collector contact may be a metal or it may be a semiconductor electrically connected to a metal and it may be of n-type or p-type or degenerate. The ultimate metal terminal should make low resistivity contact to the adjoining layer. The Fermi level throughout the layers of the device should be continuous.

To insure that the device may be able to pass current, the voltage difference between the emitter contact and the collector contact should be suitably directed. For the case where the majority carriers are electrons, the voltage of the collector contact should be positive with respect to the emitter contact. The magnitude of the emitter current injected into the control grid layer is first determined by the voltage difference across the insulating layer 21′. Among other parameters, the carrier density in the conduction band of the emitter contact is of primary importance. In the case of a p-type semiconductor where the majority carriers are holes, the potential difference must be negative at the collector contact with respect to the emitter contact.

The grid control should be of low resistivity, but may be metallic or a semiconductor connected to a metallic terminal, and if a semiconductor it should be preferably degenerate. In order that the element 22′ or 27 can function as a control grid, the emitter current which reaches the collector contact must be modulated by a voltage applied betwen the control grid and the emitter contact. This modulation may result from operations which occur in the structure, which depend on the voltage applied to the control grid in relationship to the voltage applied to the emitter and the collector contacts.

In order to act as a modulator, the control grid must alter the transport of carriers injected into the control grid layer by the emitter layer, that is, the control grid layer and the insulating layer 21′ form the emitter junction and carriers from this junction which pass across the insulating layer $21^2$ are important. If the control grid layer is a semiconductor, as in FIGURE 2, the modulation for a thick layer will be determined also in part by whether the carriers attain a terminal velocity in that layer or diffuse across it. This will be determined by the value of the electric field intensity in that layer, that is, by whether it is sufficiently high to deplete that layer or whether the electric field gradient is so low that the carriers diffuse across that layer.

The magnitude of the current passing across the collector junction, that is, in FIGURE 2 the insulating layer $21^2$ and collector contact 26, will depend on a number of parameters, such as the density of carriers in the grid control layer 22'. This last will include the carriers injected into the grid control layer from the emitter junction. The magnitude of the current will also be determined by the value of the voltage across the insulating layer 21'. If the collector contact is composed of a semiconductor portion as in FIGURE 4, the current will be determined in part by the value of the electric field intensity in the semiconductor section of the collector contact layer, since that determines either the rate of diffusion or the terminal velocity, depending on the numerical value of the electrict intensity.

One of the major parameters governing the operation of the crystal triodes of FIGURES 2 and 4 is the relative resistance across insulating layers 21' and $21^2$. If the insulating layers have the same resistivity, then the relative thickness is important. If the collector junction is to function in the manner commonly assumed for such a structure, the ratio of the thickness of insulator layer $21^2$ to that of insulator layer 21' should be less than 1, if both insulators have the same resistivity. The same condition can be achieved by having in the insulating layer $21^2$ a space charge distribution or built-in potential barrier which facilitates current passage, while insulator layer 21' has no space charge separation or has a built-in potential barrier which impedes current flow. Suitable thicknesses for the insulator layers 21' and $21^2$ and in fact all the insulator layers without built-in potential barriers are of the order of 100 A. maximum, and preferably 70 A. A minimum thickness will suitably be of the order of 10 A. In some cases it will be preferable to use a higher resistivity for insulating layer 21' than for insulating layer $21^2$, in this case the two layers can be of the same thickness.

The thickness of the grid control layer 22' or 27 should be less than 100 A. and suitably more than 10 A. if the grid control does not operate as an attenuator of the emitter junction current. If the grid control however is a semiconductor as in layer 22' of FIGURE 2, then the thickness of the grid control layer may lie in the micron range and may be of the order of 10 microns. The exact value will be influenced, of course, by the relative value of the specific resistivity of the material of the grid control layer and of the insulating layers.

The various layers referred to herein are suitably of uniform thickness.

Two ranges are specified for semiconductor layer 22' since it may operate as a modulator whether the injected carriers from insulator 21' tunnel, for a thickness near 100 A., or are transported at a terminal velocity across it, for a thickness in the micron range.

The thickness of the insulators 21, 21' or $21^2$ with built-in potential barriers may be considerably greater than for insulators without such barriers and may reach several hundred angstroms.

Even more complex structures may be built up by superimposing diodes on one another in succession. Still further variety may be obtained when the internal thin semiconductor forming the control grid layer is not continuous but is formed as in FIGURE 3 with control grid terminal connections made to the semiconductor particles $22^2$. In this case the particles may have a size of a few microns or a few mils.

The materials used for the semiconductors should be of the highest purity so that no extraneous impurites are present to contribute to distribution of spurious space charge.

Figure 5:
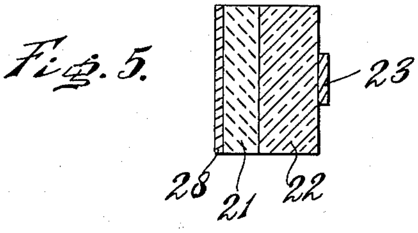

The possibility of utilizing a nonlinear element such as an electron majority carrier device as an ionizing particle detector was implied in Jenny Bramley U.S. Patent No. 2,527,981 above referred to. A suggested structure was: Metal-insulator-degenerate-p-type silicon semiconductor with a combined emitter contact and insulator thickness of the order of less than 200A. We have discovered that a device of this character can be produced to work effectively as a detector of high energy particles such as cosmic rays, alpha particles and protons, by using a device as shown in FIGURE 5. A metallic film 28 of the order of 100 A. in thickness will transmit more than 60% of the high energy particles incident on it. This film constitutes one electrode of the device and is in electrical contact with an insulating layer 21 as above described, which in turn on the opposite side is in electrical contact with a semiconductor layer 22 preferably nearly intrinsic n- or p-type, such as silicon or germanium, which is in electrical contact with the opposite metallic terminal 23 of the device.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

We claim:

1. In a high speed responsive current control device, an emitter contact extending in a plane, a first insulating layer having a thickness not in excess of 100 A. extending in electrical contact with one side of the emitter contact, a metallic film having a thickness not in excess of 100 A. in electrical contact with the side of the insulating layer remote from the emitter contact, said metallic film comprising a control grid terminal, a second insulating layer having a thickness not in excess of 100 A. extending in electrical contact with the side of the metallic film remote from the first insulating layer, a semiconductor layer in electrical contact with the side of the second insulator layer remote from the metallic film, and a collector contact in electrical conducting relation with the side of the semiconductor layer remote from the second insulating layer.

2. A device of claim 1, in which the impedance across the second insulating layer is less than the impedance across the first insulating layer.

3. A device of claim 1, in combination with means for maintaining a potential difference between the metallic film and said emitter and collector contacts to establish majority carrier injection, electrons in the emitter contact and holes in the collector contact, into said electrically insulating layers.

4. A high speed response rectifying majority carrier device comprising a sheet-like metallic layer, an electrically insulating layer having vacancies at sites of ions and being in electrical contact with one side of the metallic layer, an N-type semiconductor in electrical contact with the other side of said insulating layer, the metallic layer and the semiconductor layer being generally parallel, an electrical contact in electrically conducting relation with the other side of the semiconductor and means for maintaining a potential difference between the metallic layer and said electrical contact, the concentration of said vacancies, the thickness of said insulating layer and said potential means cooperating to establish majority carrier current path through the insulating layer.

5. A device of claim 4, in which the insulating layer has a thickness not in excess of 100 A.

6. A device of claim 4, in which the insulating layer is composed of a material of the class consisting of silicon oxide, and an alkali halide.

7. A high energy particle detector comprising a metallic film having a thickness not in excess of 100 A., an insulating layer in electrical contact with one side of said metallic film, said insulating layer having a thickness not in excess of 100 A., a P-type semiconducting layer in electrical contact with the other side of said insulating layer, the combined thickness of the metallic film and the insulating layer being such that high energy particles can penetrate through both into the semiconducting layer, and an electrical contact making electrical connection with the other side of said semiconducting layer.

References Cited by the Examiner

UNITED STATES PATENTS

| | | | |
|---|---|---|---|
| 1,906,691 | 5/33 | Lilienfeld | 317—234 |
| 2,172,904 | 9/39 | Holst et al. | 317—235 |
| 2,328,440 | 8/43 | Esseling et al. | 317—241 |
| 2,386,750 | 10/45 | Saslaw | 317—241 |
| 2,428,400 | 10/47 | Van Geel | 317—235 |
| 2,456,758 | 12/48 | Van Geel | 317—235 |
| 2,657,345 | 10/53 | Stuetzer | 317—235 |
| 2,707,762 | 5/55 | Stuetzer | 317—235 |
| 2,758,263 | 8/56 | Robillard | 317—235 |
| 3,015,770 | 1/62 | Van Santen et al. | 317—234 X |
| 3,033,714 | 5/62 | Ezaki et al. | |
| 3,056,073 | 9/62 | Mead. | |

JOHN W. HUCKERT, *Primary Examiner.*

SAMUEL BERNSTEIN, GEORGE N. WESTBY, DAVID J. GALVIN, *Examiners.*